United States Patent
Young et al.

(10) Patent No.: US 9,785,511 B2
(45) Date of Patent: Oct. 10, 2017

(54) NETWORK DEVICE AND OPERATING METHOD THEREOF

(71) Applicant: Synology Incorporated, Taipei (TW)

(72) Inventors: Ting-Jung Young, Taipei (TW); Cheng-I Chen, Taipei (TW); Hsin-Wei Huang, Taichung (TW); Sheng-Chien Lin, Yunlin County (TW)

(73) Assignee: Synology Incorporated, Taipei (TW)

( * ) Notice: Subject to any disclaimer, the term of this patent is extended or adjusted under 35 U.S.C. 154(b) by 568 days.

(21) Appl. No.: 14/516,567

(22) Filed: Oct. 16, 2014

(65) Prior Publication Data

US 2015/0248335 A1 Sep. 3, 2015

(30) Foreign Application Priority Data

Mar. 3, 2014 (TW) .................................. 103107021

(51) Int. Cl.
| | | |
|---|---|---|
| *G06F 17/00* | (2006.01) |
| *G06F 11/14* | (2006.01) |
| *G06F 3/0482* | (2013.01) |
| *G06F 3/0484* | (2013.01) |
| *G06F 17/30* | (2006.01) |
| *G06F 3/048* | (2013.01) |

(52) U.S. Cl.
CPC .......... *G06F 11/1451* (2013.01); *G06F 3/048* (2013.01); *G06F 3/0482* (2013.01); *G06F 3/04842* (2013.01); *G06F 17/30126* (2013.01); *G06F 11/1448* (2013.01); *G06F 11/1458* (2013.01)

(58) Field of Classification Search
CPC ......... G06F 17/30575; G06F 17/30091; G06F 17/30067; G06F 17/30073; G06F 17/30115; G06F 11/1469; G06F 11/1451

USPC .......................................... 707/654, 640, 679
See application file for complete search history.

(56) References Cited

U.S. PATENT DOCUMENTS

| | | | | |
|---|---|---|---|---|
| 7,966,293 | B1* | 6/2011 | Owara ................. | G06F 11/1469 707/654 |
| 8,200,638 | B1* | 6/2012 | Zheng ................. | G06F 11/1464 707/679 |
| 2009/0171785 | A1* | 7/2009 | Kano ...................... | G06Q 30/02 705/14.19 |
| 2009/0248759 | A1* | 10/2009 | Okada ................. | G06F 11/1456 |
| 2011/0191306 | A1* | 8/2011 | Akagawa .......... | G06F 17/30117 707/692 |

FOREIGN PATENT DOCUMENTS

TW                495694              7/2002

* cited by examiner

*Primary Examiner* — Dung K Chau
(74) *Attorney, Agent, or Firm* — CKC & Partners Co., Ltd.

(57) ABSTRACT

An operating method of a backup device includes displaying a window corresponding to a backup destination on a graphic user interface (GUI); under a condition that an add-into-backup-list command is received via the GUI, recording a first backup entry corresponding to backup target data by a backup list according to the add-into-backup-list command; after the first backup entry is recorded, displaying an icon corresponding to the first backup entry in the window corresponding to the backup destination; and under a condition that a start-backup command is received via the GUI, backing up the backup target data into the backup destination according to the start-backup command.

18 Claims, 10 Drawing Sheets

NETWORK DEVICE AND OPERATING METHOD THEREOF

RELATED APPLICATIONS

This application claims priority to Taiwanese Application Serial Number 103107021, filed Mar. 3, 2014, which is herein incorporated by reference.

BACKGROUND

Field of Invention

The present invention relates to an electronic device and an operating method thereof. More particularly, the present invention relates to a backup device and an operating method thereof.

Description of Related Art

With advances in information technology, electronic devices, such as computers and smart phones, are widely used in our daily lives.

A typical electronic device may use a local storage to store data. However, the data stored in the local storage may be lost when the local storage or the electronic device is damaged. Hence, to avoid such a situation, backup systems configured to backup data are used.

In a typical backup system, a tree structure is usually used to display the backup target data or the backed up data. However, with such a configuration, when a large amount of data is involved, the tree structure may be complex and therefore cause inconvenience for the user.

Thus, a more user-friendly backup system is desired.

SUMMARY

One aspect of the present disclosure is related to an operating method. In accordance with one embodiment of the present disclosure, the operating method is applied to a backup device. The operating method includes displaying a graphic user interface (GUI); displaying a window corresponding to a backup destination on the GUI; under a condition that an add-into-backup-list command is received via the GUI, recording a first backup entry corresponding to backup target data by a backup list according to the add-into-backup-list command; after the first backup entry is recorded by the backup list, displaying an icon corresponding to the first backup entry in the window corresponding to the backup destination; and under a condition that a start-backup command is received via the GUI, backing up the backup target data into the backup destination to serve as a backed up version of the backup target data according to the start-backup command.

In accordance with one embodiment of the present disclosure, the operating method further includes determining whether another backup entry is added into the backup list during a predetermined period after the first backup entry is recorded by the backup list and automatically backing up the backup target data into the backup destination under a condition that no backup entry is added into the backup list during the predetermined period after the recordation of the first backup entry.

In accordance with one embodiment of the present disclosure, the operating method further includes displaying an icon corresponding to the backup target data on the GUI and displaying an icon corresponding to the backup destination on the GUI. The step of recording the first backup entry by the backup list according to the add-into-backup-list command includes recording the first backup entry by the backup list under a condition that the icon corresponding to the backup target data is dragged to a region corresponding to the icon corresponding to the backup destination or dragged to the window corresponding to the backup destination.

In accordance with one embodiment of the present disclosure, the operating method further includes displaying an icon corresponding to the backup target data on the GUI and displaying an icon corresponding to the backup destination on the GUI. The step of recording the first backup entry by the backup list according to the add-into-backup-list command includes recording the first backup entry by the backup list under a condition that a copy command corresponding to the icon corresponding to the backup target data and a paste command corresponding to either the icon corresponding to the backup destination or the window corresponding to the backup destination are sequentially received via the GUI.

In accordance with one embodiment of the present disclosure, the operating method further includes displaying an icon corresponding to the backup target data on the GUI. The step of recording the first backup entry by the backup list according to the add-into-backup-list command includes recording the first backup entry by the backup list under a condition that the add-into-backup-list command in a mouse right click menu is received via the GUI. The mouse right click menu corresponds to the icon corresponding to the backup target data.

In accordance with one embodiment of he present disclosure, a second backup entry is recorded in the backup list. The operating method includes displaying an icon corresponding to the second backup entry on the GUI according to a backup state of the second backup entry.

In accordance with one embodiment of the present disclosure, the second backup entry corresponds to backed up data, and the backed up data is backed up in a plurality of backed up versions. The operating method includes displaying a plurality of icons respectively of the backed up versions corresponding to the backed up data on the GUI under a condition that a display-backup-version command is received via the GUI.

In accordance with one embodiment of the present disclosure, the second backup entry corresponds to backed up data, and the backed up data is backed up in a plurality of backed up versions. The operating method includes, under a condition that a view-version command corresponding to a time point is received via the GUI, displaying an icon corresponding one of the backed up versions corresponding to the time point on the GUI.

In accordance with one embodiment of the present disclosure, the second backup entry corresponds to backed up data, and the backed up data is backed up in a backed up version. The operating method includes, under a condition that a recovery command is received via the GUI, recovering the backed up data by using the backed up version of the backed up data according o the recovery command.

In accordance with one embodiment of the present disclosure, the second backup entry corresponds to backed up data, and the backed up data is backed up in a backed up version. The operating method includes displaying an icon corresponding to the second backup entry on the GUI, and opening the backed up version of the backed up data under a condition that an open-data command corresponding to the icon corresponding to the second backup entry is received via the GUI.

Another aspect of the present disclosure related to a backup device. In accordance with one embodiment of the present disclosure, the backup device includes a storage component and a processing component. The storage component includes a backup destination. The processing component is configured for providing information of a GUI to a display component to make the display component display the GUI and making the display component display a window corresponding to a backup destination on the GUI. Under a condition that the processing component receives an add-into-backup-list command via the GUI, the processing component records a first backup entry corresponding to backup target data by a backup list according to the add-into-backup-list command. After the processing component records the first backup entry by the backup list, the processing component makes the display component display an icon corresponding to the first backup entry in the window corresponding to the backup destination. Under a condition that the processing component receives a start-backup command via the GUI, the processing component backs up the backup target data into the backup destination to serve as a backed up version of the backup target data according to the start-backup command.

In accordance with one embodiment of the present disclosure, the processing component is further configured for determining whether another backup entry is added into the backup list during a predetermined period after the first backup entry is recorded by the backup list, and automatically backing up the backup target data into the backup destination under a condition that no backup entry is added into the backup list during the predetermined period after the recordation of the first backup entry.

In accordance with one embodiment of the present disclosure, the processing component is further configured for making the display component display an icon corresponding to the backup target data on the GUI, making the display component display an icon corresponding to the backup destination on the GUI, and recording the first backup entry by the backup list under a condition that the icon corresponding to the backup target data is dragged to a region corresponding to the icon corresponding to the backup destination or dragged to the window corresponding to the backup destination.

In accordance with one embodiment of the present disclosure, the processing component is further configured for making the display component display an icon corresponding to the backup target data on the GUI, making the display component display an icon corresponding to the backup destination on the GUI, and recording the first backup entry by the backup list under a condition that a copy command corresponding to the icon corresponding to the backup target data and a paste command corresponding to either the icon corresponding to the backup destination or the window corresponding to the backup destination are sequentially received via the GUI.

In accordance with one embodiment of the present disclosure, the processing component is further configured for making the display component display an con corresponding to the backup target data on the GUI, making the display component display an icon corresponding to the backup destination on the GUI, and recording the first backup entry by the backup list under a condition that the add-into-backup-list command in a mouse right click menu is received via the GUI. The mouse right click menu corresponds to the icon corresponding to the backup target data.

In accordance with one embodiment of the present disclosure, a second backup entry is recorded in the backup list, and the processing component is further configured for making the display component display an icon corresponding to the second backup entry on the GUI according to a backup state of the second backup entry.

In accordance with one embodiment of the present disclosure, the second backup entry corresponds to backed up data, the backed up data is backed up in a plurality of backed up versions, and the processing component is further configured for making the display component display a plurality of icons respectively corresponding to the backed up versions of the backed up data on the GUI under a condition that a display-backup-version command is received via the GUI.

In accordance with one embodiment of the present disclosure, the second backup entry corresponds to backed up data, the backed up data is backed up in a plurality of backed up versions, and the processing component is further configured for, under a condition that a view-version command corresponding to a time point is received via the GUI, making the display component display an icon corresponding one of the backed up versions corresponding to the time point on the GUI.

In accordance with one embodiment of the present disclosure, the second backup entry corresponds to backed up data, the backed up data is backed up in a backed up version, and the processing component is further configured for, under a condition that a recovery command is received via the GUI, recovering the backed up data by using the backed up version of the backed up data recording to the recovery command.

In accordance with one embodiment of the present disclosure, the second backup entry corresponds to backed up data, the backed up data is backed up in a backed up version, and the processing component is further configured for making the display component display an icon corresponding to the second backup entry on the GUI and opening the backed up version of the backed up data under a condition that an open-data command which corresponds to the icon corresponding to the second backup entry is received via the GUI.

Through utilizing one embodiment described above, a more user-friendly backup device can be realized.

DETAILED DESCRIPTION

Figure 1:
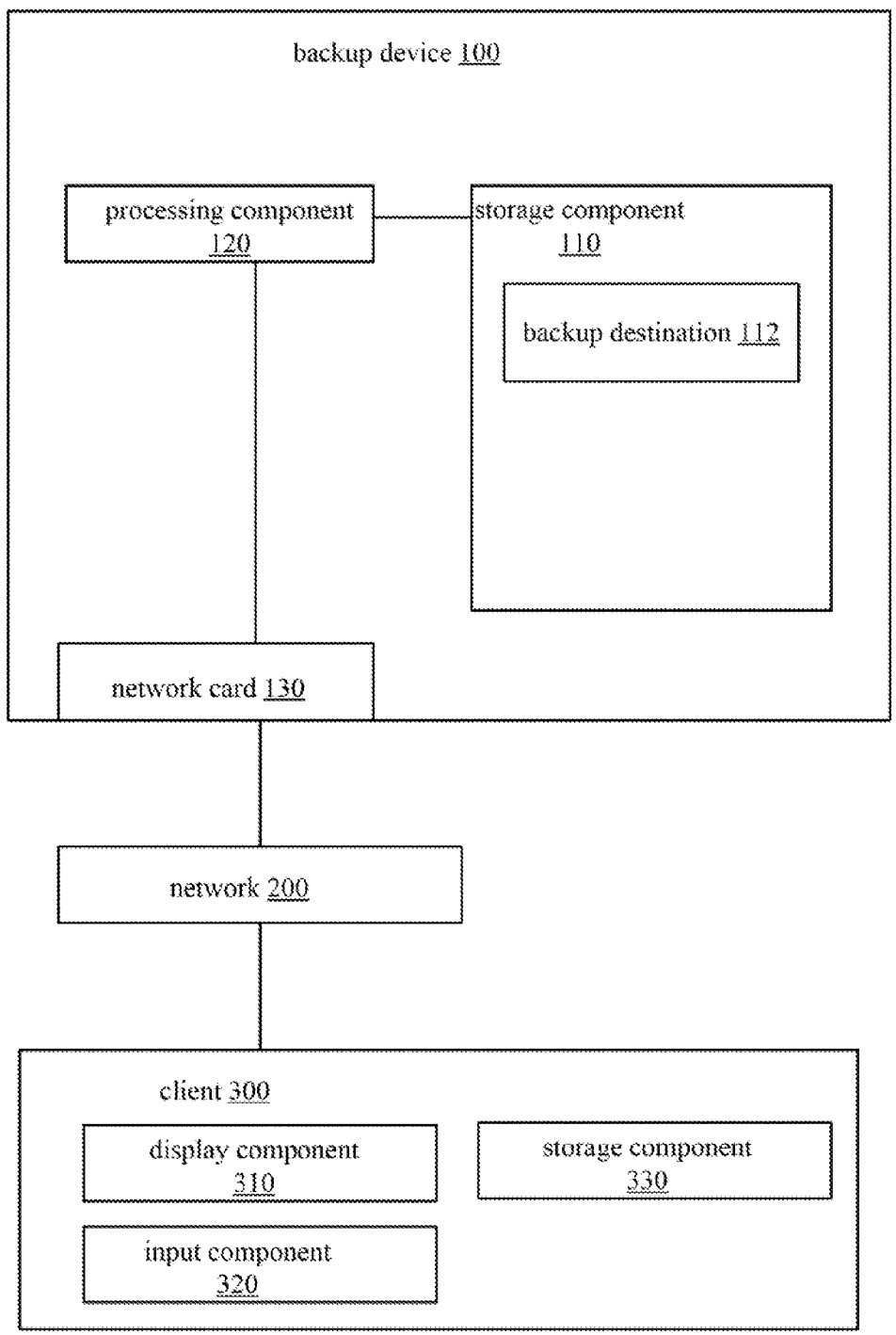
FIG. 1 is a schematic diagram of a backup device according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, when an element is referred to as being "connected" or "electrically connected" to another element, it can be directly connected to the other element or intervening elements may be present. In contrast, when an element is referred to as being "directly connected" to another element, there are no intervening elements present. Moreover, "electrically connect" or "connect" can further refer to the interoperation or interaction between two or more elements.

It will be understood that, in the description herein and throughout the claims that follow, the terms "comprise" or "comprising," "include" or "including," "have" or "having," "contain" or "containing" and the like used herein are to be understood to be open-ended, i.e., to mean including but riot limited to.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. §112(f). In particular, the use of "step of" in the claims herein is not intended to invoke the provisions of 35 U.S.C. §112(f).

One aspect of the present disclosure is related to a backup device. To facilitate the description to follow, a network attached storage (NAS) is taken as a descriptive example in the following paragraphs. However, the present disclosure is not limited to such a device. In some embodiments, the backup device may be a desktop computer, a tablet computer, a smart phone, etc.

FIG. 1 is a schematic diagram of a backup device 100 according to one embodiment of the present invention. The backup device 100 includes a storage component 110, a processing component 120, and a network card 130. The processing component 120 is separately connected to the storage component 110 and the network card 130.

In one embodiment, the storage component 110 may be realized by using a read-only memory (ROM), a flash memory, a floppy disc, a hard disc, an optical disc, a flash disc, a tape, a database accessible from a network, or any storage medium with the same functionality that can be contemplated by persons of ordinary skill in the art to which this disclosure pertains. The processing component 120 may be realized by using a central processing unit (CPU), a control component, a microprocessor, or another hardware component which is able to perform commands.

In one embodiment, the backup device 100 can create a wire or wireless connection to a client device 300 via a network 200 by utilizing the network card 130. Through such a connection, a user can backup the data stored in a storage component 330 of the client device 300 into the backup device 100 via the network 200.

To facilitate the description to follow, details of the present disclosure are described in the paragraphs below with reference to FIGS. 2-8. However, the present disclosure is not limited to the embodiments in FIGS. 2-8.

Figure 2:
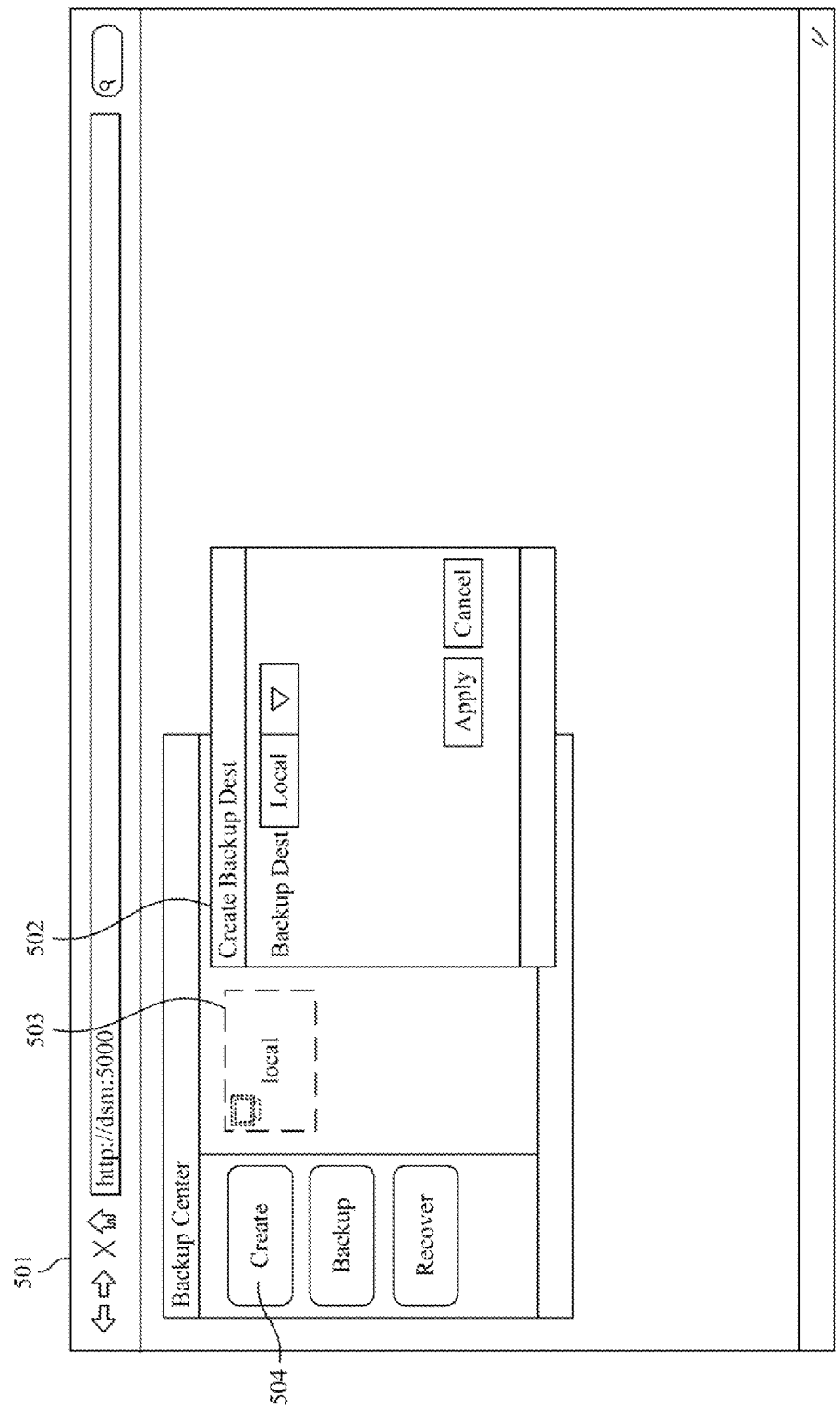
FIGS. 2-8 illustrate operative examples according to various embodiments of the present invention.

Particular reference is made to FIG. 2. In one embodiment of the present disclosure, the processing component 120 can provide information of a graphic user interface (GUI) 501 to the client device 300 via the network 200, to allow a display component 310 of the client device 300 to display the GUI 501. Through such operation, the user can perform an operation on the GUI 501 through an input component 320 of the client device 300 to backup data stored in the storage component 330 of the client device 300 into the backup device 100.

In one embodiment, the information of the GUI 501 can be stored in, for example, the storage component 110 of the backup device 100. The processing component 120 can access the storage component 110 to acquire the information of the GUI 501 and provide the information of the GUI 501 to the client device 300. In one embodiment, the client device 300 can display the GUI 501 through a browser.

In one embodiment, the input component 320 of the client device 300 may be, for example, a keyboard, a mouse, a button, or another suitable input device. The display component 310 of the client device 300 may be, for example, a liquid crystal display (LCD), a cathode ray tube (CRT), a display, a plasma display, or another suitable display device. The storage component 330 may be, for example, a read-only memory (ROM), a flash memory, a floppy disc, a hard disc, an optical disc, a flash disc, a tape, a database accessible from a network, or another suitable storage device.

In one embodiment, the processing component 120 can receive a create-backup-destination command via the GUI 501, and create a backup destination 112 in the storage component 110 of the backup device 100 according to the create-backup-destination command. Subsequently, the processing component 120 can make the display component 310 display an icon 503 corresponding to the backup destination 112 on the GUI 501.

For example, the processing component 120 can make the display component 310 display a button 504. When a user clicks on the button 504 (e.g., by a mouse left click), the processing component 120 makes the display component 310 display a window 502 on the GUI 501. After the user finishes configurations of the backup destination 112 via the window 502, the GUI 501 transmits information of such an operation to the processing component 120 as the create-backup-destination command. The processing component 120 receives the create-backup-destination command, and accordingly creates the backup destination 112 and makes the display component 310 display the icon 503 corresponding to the backup destination 112 on the GUI 501.

Figure 3:
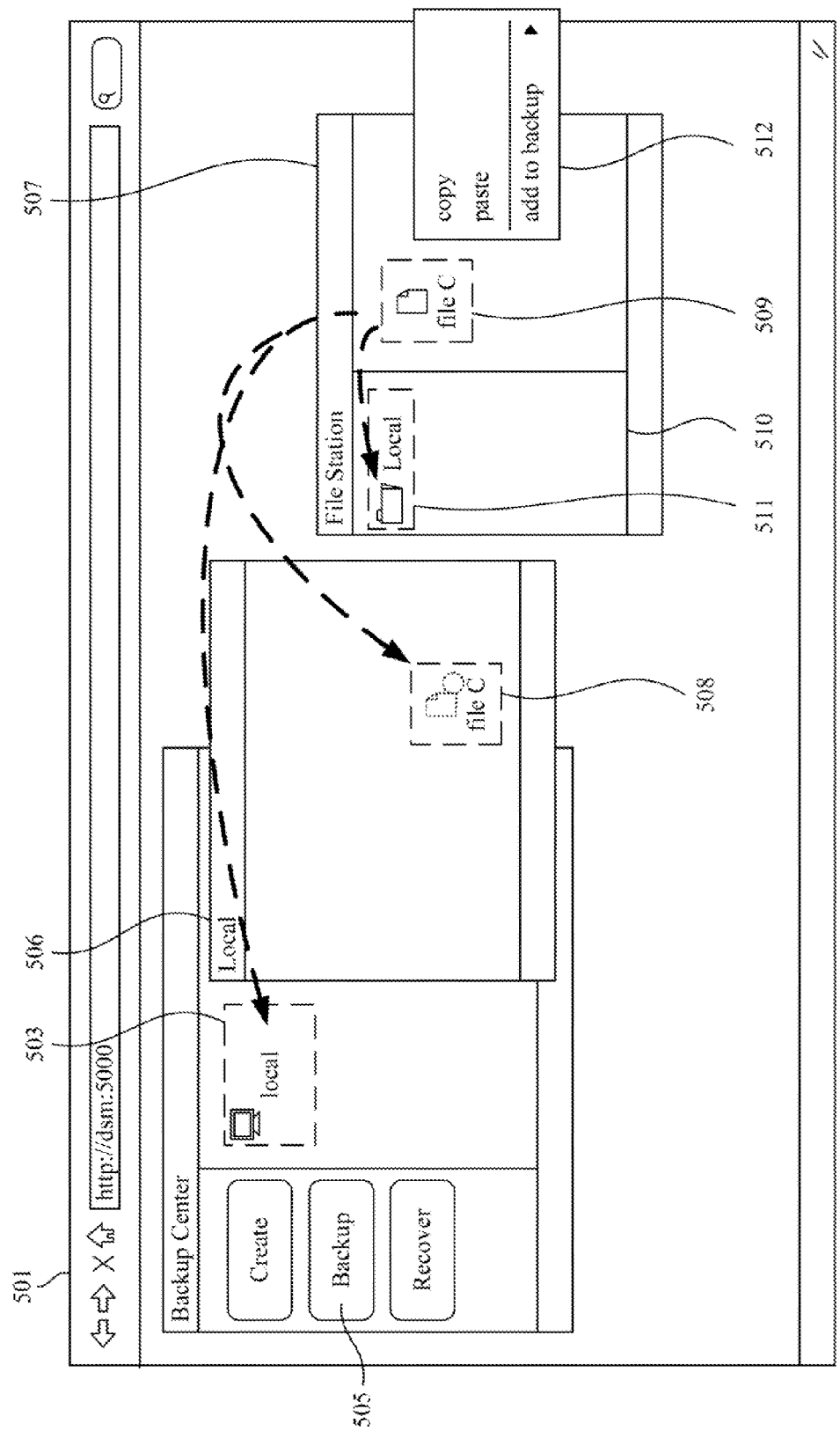

Reference is made to FIG. 3. In one embodiment, after the backup destination 112 has been created, the processing component 120 may receive an open-backup-destination command corresponding to the backup destination 112 via the GUI 501, and accordingly make the display component 310 display a window 506 corresponding to the backup destination 112 on the GUI 501.

For example, when the user clicks on the icon 503 (e.g., by double clicking a mouse left button), the GUI 501 transmits information of such an operation to the processing component 120 as the open-backup-destination command. The processing component 120 receives the open-backup-destination command, and accordingly makes the display component 310 display the window 506 corresponding to the backup destination 112.

In one embodiment of the present disclosure, after the backup destination 112 is created, when the processing component 120 receives an add-into-backup-list command via the GUI 501, the processing component 120 records a backup entry E1 (not shown) corresponding to backup target data by a backup list LST corresponding to the backup destination 112 according to the add-into-backup-list command. Subsequently, the processing component 120 makes the display component 310 display an icon 508 corresponding to the backup entry E1 in the window 506 corresponding to the backup destination 112.

For example, a user may open a file-station window 507. An icon 509 corresponding to a file C (e.g., backup target data) stored in the storage component 330 may be presented in the file-station window 507. When the user drags the icon 509 to the window 506 corresponding to the backup destination 112 or to a region corresponding to the icon 503 which corresponds to the backup destination 112 via the GUI 501, the GUI 501 transmits information of such an operation to the processing component 120 as the add-into-backup-list command. The processing component 120 receives the add-into-backup-list command, and accordingly records the backup entry E1 corresponding to the file C by the backup list LST. Next, the processing component 120 makes the display component 310 display the icon 508 corresponding to the file C and the backup entry E1 in the window 506 corresponding to the backup destination 112.

In addition, in some embodiments, the file-station window 507 may include a file directory region 510. An icon 511 corresponding to the backup destination 112 may be presented in the file directory region 510. When the user drags the icon 509 to a region corresponding to the icon 511 via the GUI 501, the GUI 501 transmits information of such an operation to the processing component 120 as the add-into-backup-list command. The processing component 120 receives the add-into-backup-list command, and accordingly records the backup entry E1 corresponding to the file C by the backup list LST.

Moreover, in some embodiments, the user may open a mouse right click menu 512 corresponding to the icon 509 (e.g., by a mouse right click on the icon 509) via the GUI 501. When the user chooses the add-to-backup command in the mouse right click menu 512, the GUI 501 transmits information of such an operation to the processing component 120 to serve as the add-into-backup-list command. The processing component 120 receives the add-into-backup-list command, and accordingly records the backup entry E1 corresponding to the file C by the backup list LST. It should be noted that, in one embodiment, a particular application may be installed, so as to allow the add-into-backup-list command to be presented in the mouse right click menu 512.

Furthermore, in some embodiments, when the user performs a copy operation (e.g. by selecting a copy command in the mouse right click menu 512) corresponding to the icon 509 and subsequently performs a paste operation (e.g. by selecting a paste command in a mouse right click menu) corresponding to the icons 503, 511 or the window 506 via the GUI 501, the GUI 501 transmits information of such an operation to the processing component 120 as the add-into-backup-list command. The processing component 120 receives the add-into-backup-list command, and accordingly records the backup entry E1 corresponding to the file C by the backup list LST.

It should be noted that the embodiments above are merely used as examples to describe aspects of "the add-into-backup-list command," and the present disclosure is not limited in this regard. Other embodiments are within the contemplated scope of the present disclosure.

In one embodiment, the backup list LST may be stored in the backup destination 112 of the backup device 100. In another embodiment, the backup list LST may be stored in the storage component 330 of the client device 300.

In one embodiment, the backup list LST may record an original path of the backup target data in the client device 300. With such operation, the backup device 100 can retain the directory structure related to the backup target data in the client device 300 via the backup list LST.

In one embodiment, the backup list LST may further record some information of the backup target data, such as the data type, data size, authentication, data state, date modified, date created, owner, etc. However, the present disclosure is not limited to such types of information.

In one embodiment of the present disclosure, after the processing component 120 records the backup entry (e.g., the backup entry E1) corresponding to the backup target data (e.g., the file C) by the backup list LST, when the processing component 120 receives a start-backup command, the processing component 120 backs up the backup target data (e.g., the file C) stored in the storage component 330 of the client device 300 into the backup destination 112 of the backup device 100 according to the start-backup command and the backup entry E1 in the backup list LST, to serve as a backed up version BK-C (not shown) of the backup target data.

For example, the processing component 120 may make the display component 310 display a button 505 on the GUI 501. When the user clicks the button 505 (e.g., by using a mouse left click) through the input component 320, the GUI 501 transmits information of such an operation to the processing component 120 as the start-backup command. The processing component 120 receives the start-backup command, and accordingly backs up the file C stored in the storage component 330 of the client device 300 into the backup destination 112 of the backup device 100.

Through the operation described above, a user can backup data stored in the client device 300 into the backup device 100 by a process that is as easy as copying a file to the backup device 100. Hence, a more user-friendly backup device can be realized.

In some approaches, during a backup process, backup target data is simply copied to the backup destination. However, with such an approach, when the backup target data is copied to the backup destination, the directory structure related to the backup target data may be lost, causing inconvenience of recovery.

In contrast, in one embodiment of the present disclosure, a backup list (e.g., the backup list LST) is used to record a backup entry (e.g., the backup entry E1) of backup target data (e.g., the file C), and the backup target data is backed up in the backup destination 112 according to the backup entry of the backup list. Through such operation, during the recovery process, the data can be recovered according to the backup list, such that inconvenience of recovery caused by loss of the directory structure can be avoided.

In one embodiment, the processing component 120 may determine whether another backup entry is added into the backup list LST during a predetermined period (e.g., 30 minutes) after the recordation of the backup entry E1 corresponding to the file C through the backup list LST. If another backup entry is not added into the backup list LST during this predetermined period the processing component 120 may automatically backup the file C corresponding to the backup entry E1 into the backup destination 112 of the backup device 300.

Through such operation, after the backup entry E1 corresponding to the file C is recorded into the backup list LST, the processing component 120 can automatically backup the file C even if the user forgets to perform the backup operation (e.g., forgets to click the button 505).

It should be noted that, in some embodiments, the predetermined period can be configured by the user.

Figure 4:
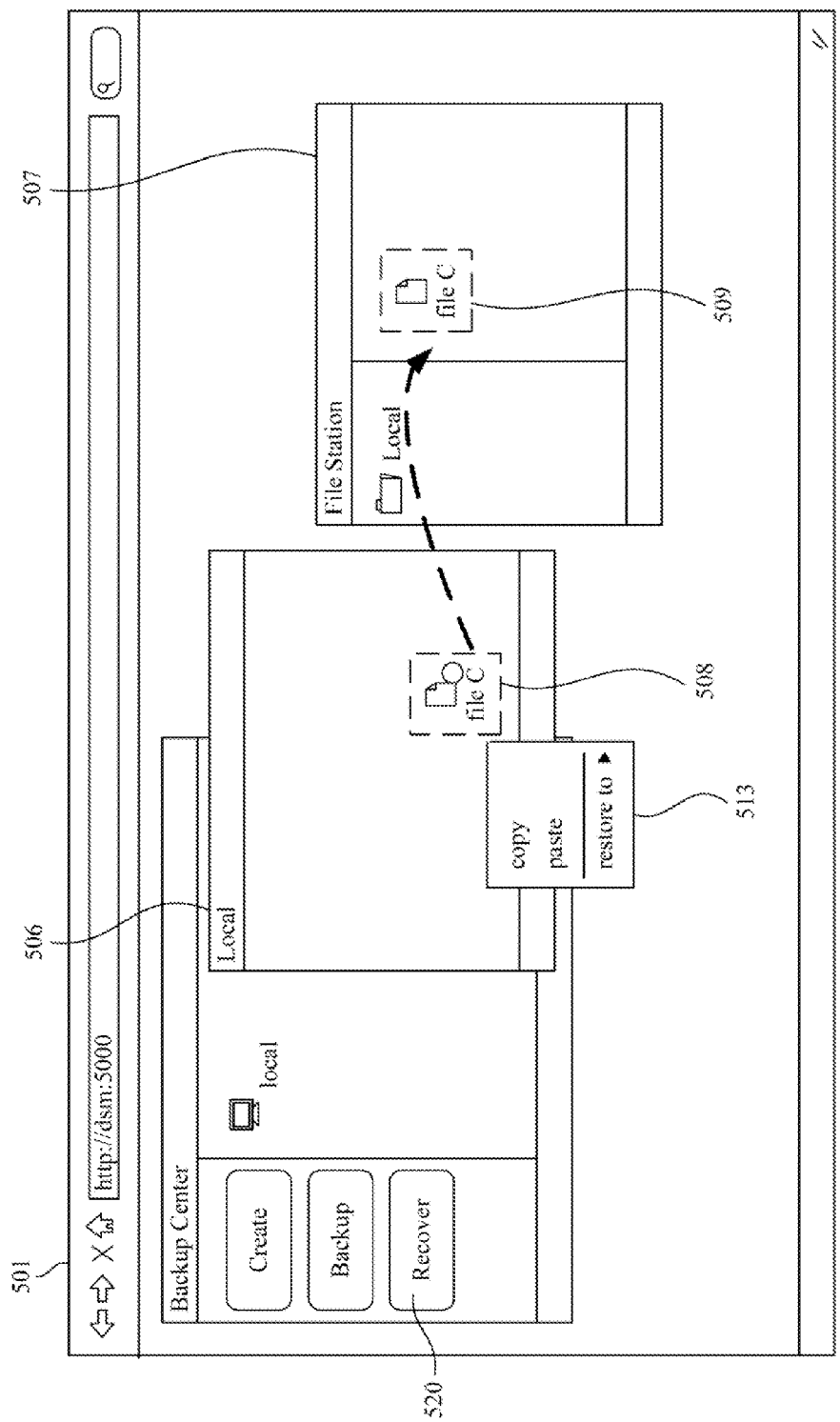

Particular reference is made to FIG. 4. In one embodiment of the present disclosure, under a condition that a backed up version (e.g., the backed up version BK-C) of backed up data (e.g., the file C) in the client device 300 has been stored in the backup destination 112, when the processing component 120 receives a recovery command via the GUI 501, the processing component 120 can recover the backed up data (e.g., the file C) in the client device 300 according to the recovery command by using the backed up version (e.g., the backed up version BK-C) in the backup destination 112.

For example, a user can open the window 506 corresponding to the backup destination 112 and the file-station window 507 corresponding to the file C. The icon 508 corresponding to the backup entry E1 is presented in the window 506. The icon 509 corresponding to the file C is presented in the file-station window 507. When a user drags the icon 508 to a region corresponding to the icon 509 or to the file-station window 507, the GUI 501 transmits information of such an operation to the processing component 120 as the recovery command. The processing component 120 receives the recovery command, and accordingly uses the backed up version BK-C corresponding to the backup entry E1 to recover the file C in the client device 300.

In some embodiments, a user can open a mouse right click menu 513 corresponding to the icon 508 (e.g. by a mouse right click on the icon 508) via the GUI 501. When the user chooses the restore-to command in the mouse right click menu 513, the GUI 501 transmits information of such an operation to the processing component 120 to serve as the recovery command. The processing component 120 receives the recovery command, and accordingly uses the backed up version BK-C corresponding to the backup entry E1 to recover the file C in the client device 300. It should be noted that, in this embodiment, the processing component 120 recovers the file C in the client device 300 according to the original path of the file C recorded in the backup list LST. In addition, in one embodiment, a particular application may be installed, so as to allow the recovery command to be presented in the mouse right click menu 513.

In some embodiments, when a user performs a copy operation (e.g., by selecting a copy command in the mouse right click menu 513) corresponding to the icon 508 and subsequently performs a paste operation (e.g., by selecting a paste command in a mouse right click menu) corresponding to the icon 509 or the window 507 via the GUI 501, the GUI 501 transmits information of such an operation to the processing component 120 as the recovery command. The processing component 120 receives the recovery command, and accordingly uses the backed up version BK-C corresponding to the backup entry E1 to recover the file C in the client device 300.

In some embodiments, the processing component 120 may make the display component 310 display a button 520 on the GUI 501. When a user selects the icon 508 (e.g., by using a mouse left click) and subsequently clicks the button 520 via the input component 320, the GUI 501 transmits information of such an operation to the processing component 120 as the recovery command. The processing component 120 receives the recovery command, and accordingly uses the backed up version BK-C corresponding to the backup entry E1 to recover the file C in the client device 300. It should be noted that, in this embodiment, the processing component 120 recovers the file C in the client device 300 according to the original path of the file C recorded in the backup list LST.

Moreover, it should be noted that the embodiments above are merely used as examples to describe aspects of "the recovery command," and the present disclosure is not limited in this regard. Other embodiments are within the contemplated scope of the present disclosure.

Through the operation described above, the user can recover the backed up data in the client device 300 by the data in the backup device 100 using a process that is as easy as copying data from the backup device 100 to the client device 300. Hence, a more user-friendly backup device can be realized.

In one embodiment of the present disclosure, under a condition that a backed up version (e.g., the backed up version BK-C) of backed up data (e.g., the file C) in the client device 300 has been stored in the backup destination 112, when the processing component 120 receives an open-data command via the GUI 501, the processing component 120 can open (or execute) the backed up version (e.g., the backed up version BK-C) of the backed up data (e.g., the file C) according to the open-data command, and make the display component 310 display the content of this backed up version.

For example, when a user performs an open operation on the icon 508 (e.g., by double clicking a mouse left button), the GUI 501 transmits information of such an operation to the processing component 120 as the open-data command. The processing component 120 receives the open-data command, and accordingly opens (or executes) the backed up version BK-C of the file C, and makes the display component 310 display the content of this backed up version BK-C.

Through the operation described above, the user can open the data (i.e., the backed version) stored in the backup destination 112 to view the content therein by a process that is as easy as opening a normal file. Hence, a more user-friendly backup device can be realized.

Figure 5:
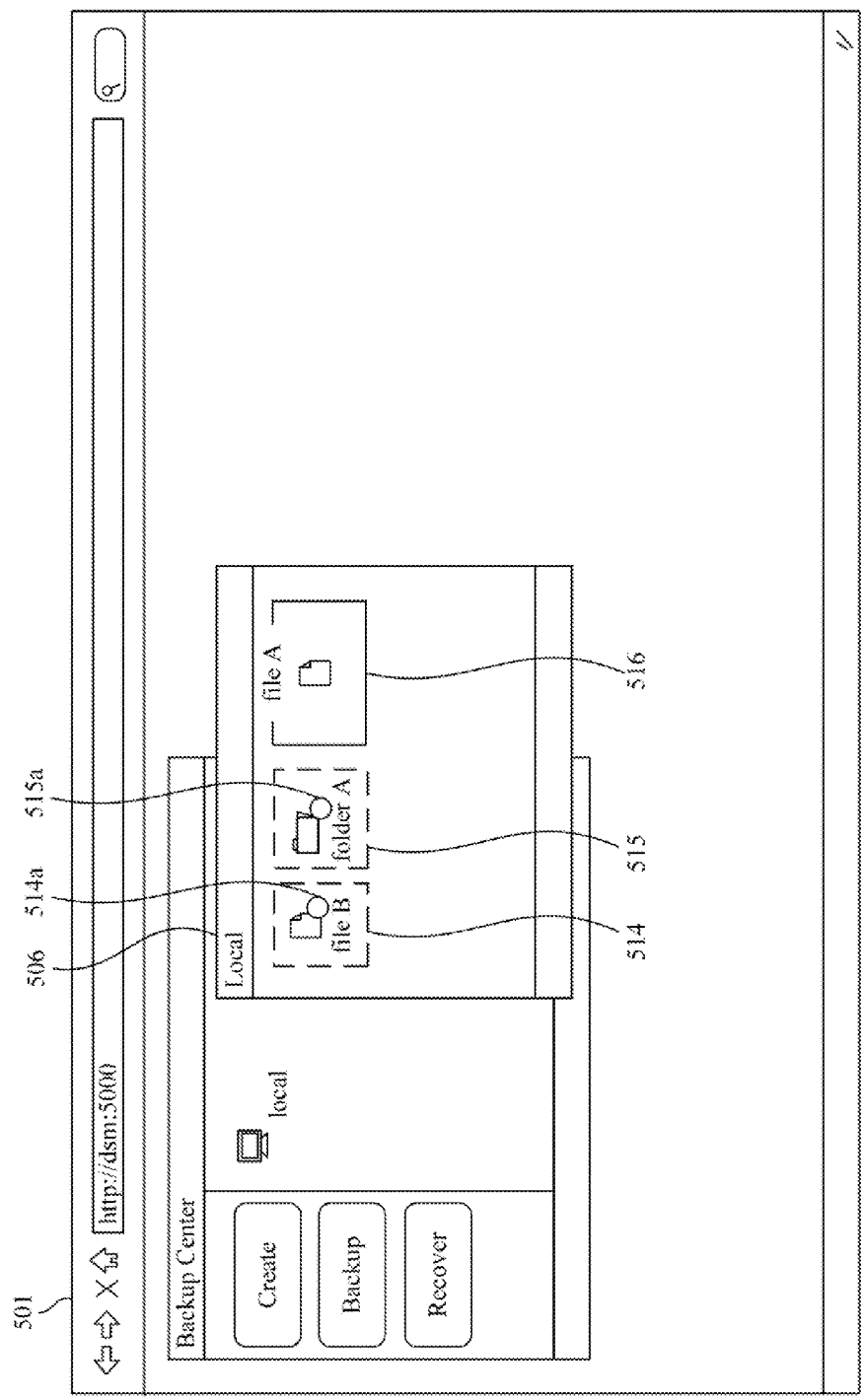

Reference is made to FIG. 5. In one embodiment, the processing component 120 may make the display component 320 display different icons (e.g., icons 514, 515) according to the data types of backed up data corresponding to backed up entries recorded in the backup list LST.

For example, under a condition that a backup entry E2 corresponding to a file B and a backup entry E3 corresponding to a folder A are recorded in the backup list LST corresponding to the backup destination 112, the backup device 100 can make the display component 310 display an icon 514 corresponding to the data type of the file B and an icon 515 corresponding to the data type of the folder A in the window 506 corresponding to the backup destination 112, It should be noted that when the backup list LST corresponding to the backup destination 112 records the backup entry E3 corresponding to the folder A, the backup list LST corresponding to the backup destination 112 actually records the backup entries corresponding to the files in the folder A. For example, if files E, F (not shown) are in the folder A, the backup list LST actually records the backup entries corresponding to the files E, F.

In one embodiment, the processing component 120 may make the display component 320 display an icon corresponding to the backup entries corresponding to the files described previously according to backup statuses of the backup entries recorded in the backup list LST.

The phrase "the backup status" may include a status in which data corresponding to the backup entry which is stored in the client device 300 has been backed up in the backup destination 112, a status in which this data has not been backed up in the backup destination 112, a status in which this data is being backed up in the backup destination 112, a status in which this data fails to be backed up in the backup destination 112 (e.g., this data is damaged), and a status in which a plurality of backed up versions corresponding to this data exist in the backup destination 112.

In one embodiment, the processing component 120 may make the display component 320 display status icons (e.g., status icons 514a, 515a) corresponding to the data status of the file B and the folder A at locations corresponding to the icons 514, 515 respectively according to the backup statuses of the backup entries recorded in the backup list LST.

For example, when the file B has not been backed up in the backup destination 112 and all of the files in the folder A have been backed up in the backup destination 112, different patterns may be presented on the status icons 514a, 515a.

With such a configuration, the user can acknowledge the backup statuses of the backup entries clearly.

Figure 6:
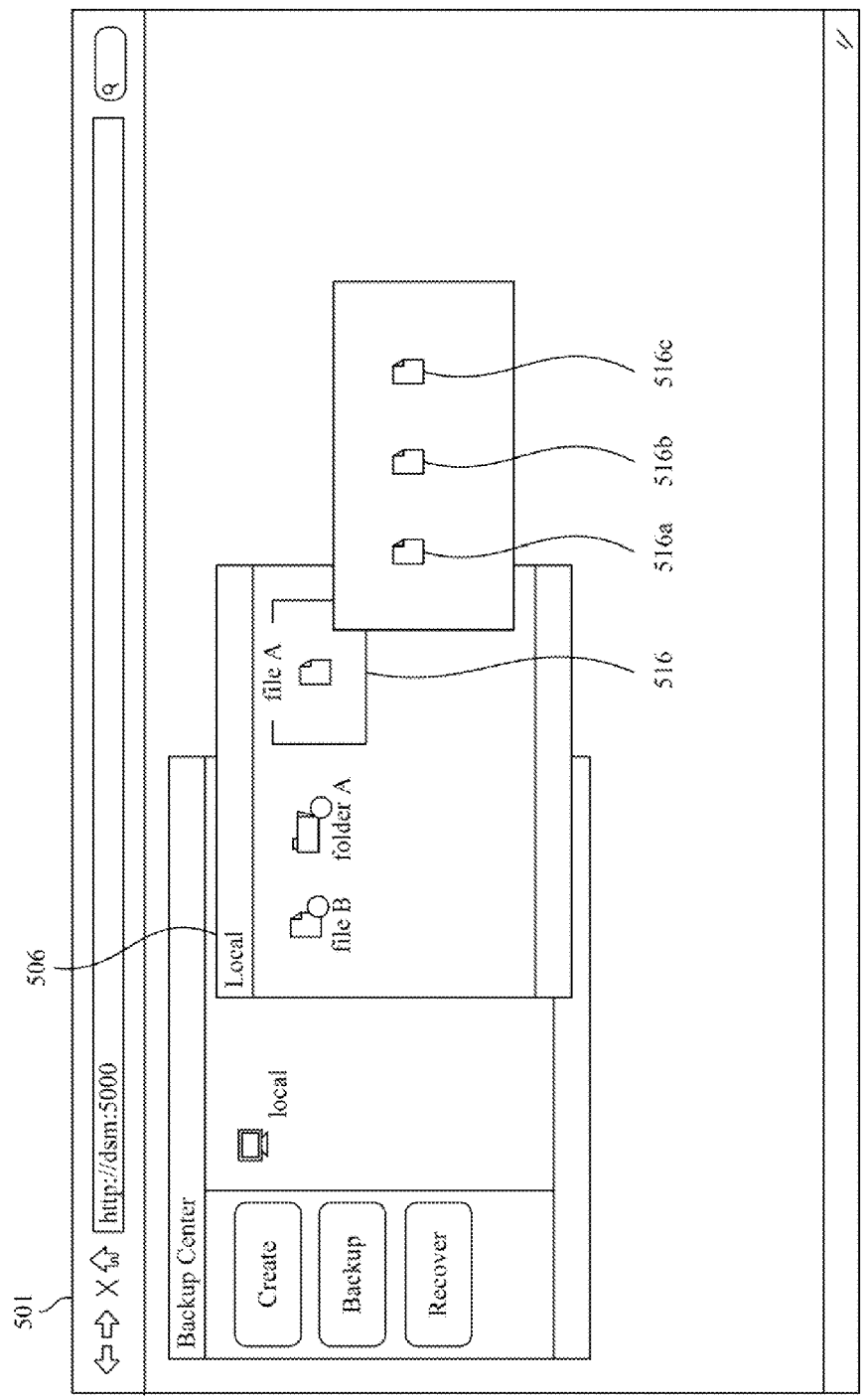

Particular reference is made to FIG. 6. In one embodiment of the present disclosure, under the condition that there exists a plurality of backed up versions in the backup destination 112 corresponding to data, in which the data corresponds to a backup entry recorded in the backup list LST, when the processing component 120 receives a display-backup-version command via the GUI 501, the processing component 120 may make the display component 310 display a plurality of icons (e.g., icons 516a-516c). Each of the icons corresponds to one of the backed up versions.

For example, under the condition that there exists backed up versions BK-A1, BK-A2, BK-A3 in the backup destination 112 corresponding to the file A, in which the file A corresponds to a backup entry E4 recorded in the backup list. LST, when a user performs an unfold operation corresponding to an icon 516 corresponding to the backup entry E4 (e.g., moves the cursor to a place corresponding to icon 516) via the GUI 501, the GUI 501 transmits information of such an operation to the processing component 120 as the display-backup-version command. The processing component 120 receives the display-backup-version command, and accordingly makes the display component 310 display the icons 516a-516c respectively corresponding to the backed up versions BK-A1, BK-A2 BK-A3 on the GUI 501.

Through such operation, a user may conveniently view the backed up versions corresponding to backed up data in the backup destination 112.

In some embodiments of the present disclosure, a file in connection with to a successive backed up version may contain the difference between the successive backed up version and the original backed up version. When the processing component 120 receives the open-data command or the recovery command corresponding to the successive backed up version, the processing component 120 may assemble the difference file with the original backed up version to make the display component 310 display the successive backed up version, or to recover the backed up file in the client device 300 with the successive backed up version.

For example, under a condition that the backed up version BK-A1 is an original backed up version and the backed up version BK-A2 is a successive backed up version, the file in connection with the backed up version BK-A2 contains a difference between the backed up versions BK-A1 BK-A2. When the processing component 120 receives the open-data command corresponding to the backed up version BK-A2, the processing component 120 assembles the difference file between the backed up versions BK-A1 BK-A2 to the backed up versions BK-A1 to make the display component 310 display the backed up version BK-A2.

In another embodiment of the present disclosure, under a condition that a specific backup entry corresponds to an original backed up version and a plurality of successive backed up versions, each of the files in connection with each of the successive backed up versions contains a difference between the corresponding backed up version and a previous backed up version. When the processing component 120 receives the open-data command or the recovery command corresponding to a specific successive backed up version, the processing component 120 may assemble all the files in connection with the successive backed up versions before this specific successive backed up version to form an overall difference between this specific successive backed up version and the original backed up version. Subsequently, the processing component 120 may assemble the overall difference with the original backed up version, to make the display component 310 display this specific successive backed up version, or to recover the backed up data in the client device 300 with this specific successive backed up version.

For example, under a condition that the backed up version BK-A1 is an original backed up version, the backed up version BK-A2 is a first successive backed up version, and the backed up version BK-A3 is a second successive backed up version, the file corresponding to the backed up version BK-A2 contains a difference between the backed up versions BK-A1 BK-A2, and the file corresponding to the backed up version BK-A3 contains a difference between the backed up versions BK-A2, BK-A3. When the processing component 120 receives the open-data command corresponding to the backed up version BK-A3, the processing component 120 assembles all of the difference files corresponding to the backed up versions BK-A2, BK-A3 to form an overall difference between the backed up version BK-A3 and the original backed up version BK-A1. Subsequently, the processing component 120 assembles the overall difference with the original backed up version BK-A1, to make the display component 310 display this successive backed up version BK-A3.

Figure 7:
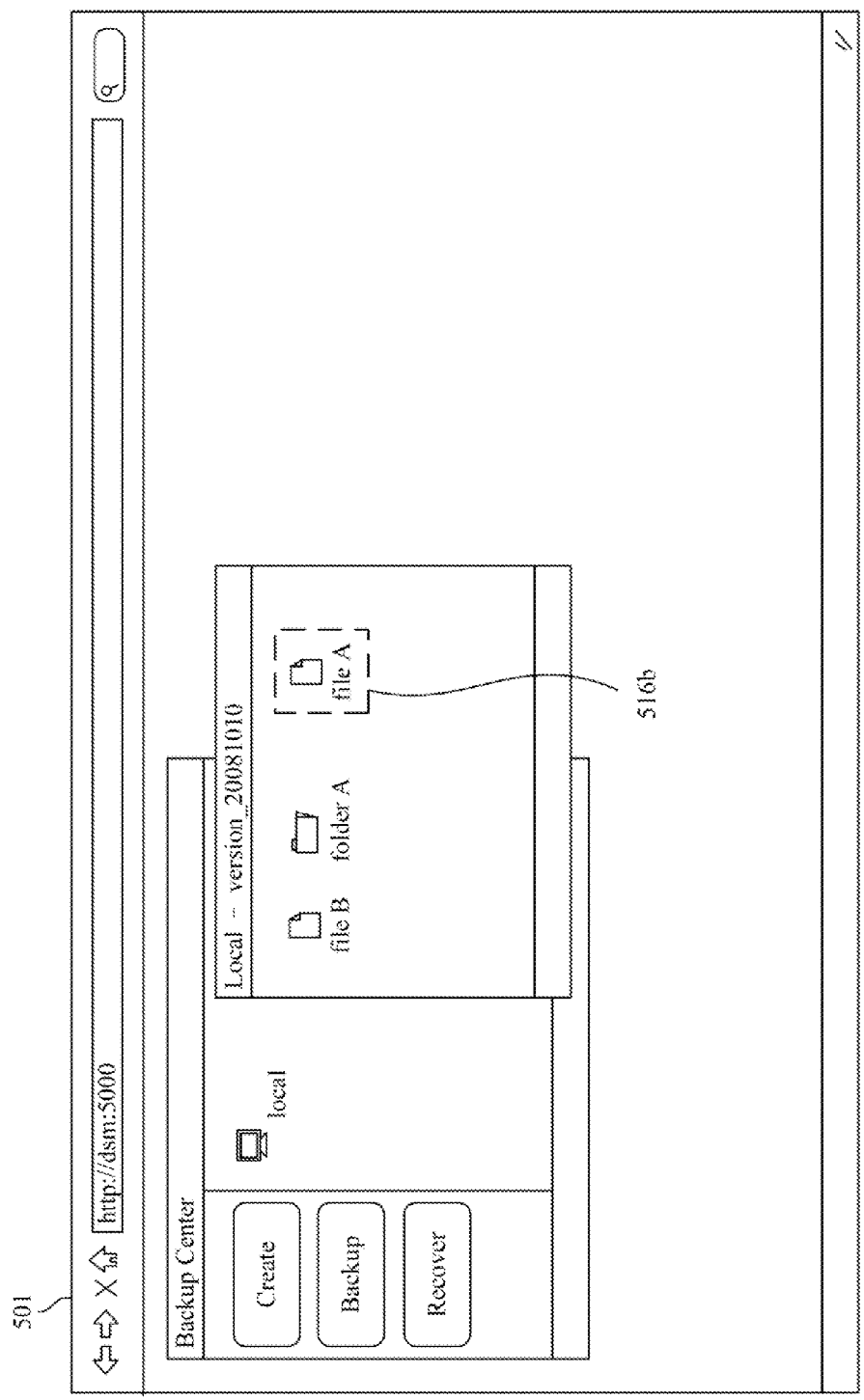

Through the operation described above, a file of repeating back up data can be avoided, such that utilization of the space of the backup destination 112 can be increased Particular reference is made to FIG. 7. In one embodiment, under a condition that there exists a plurality of backed up versions (e.g., the backed up versions BK-A1, BK-A2, BK-A3) in the backup destination 112 corresponding to backed up data (e.g., the file A), in which the backed up data corresponds to a backup entry recorded in the backup list LST, when the processing component 120 receives a view-version command corresponding to a specific time point via the GUI 501, the processing component 120 may make the display component 310 display an icon (e.g., one of the icons 516a-516c shown in FIG. 6) corresponding to one of the backed up versions (e.g., one of the backed up versions BK-A1, BK-A2, BK-A3) corresponding to this specific time point.

For example, under a condition that there exists the backed up versions BK-A1, BK-A2, BK-A3 in the backup destination 112 corresponding to the file A, when a user performs a view operation corresponding to a specific time point (e.g., a date Oct. 10, 2008) (e.g. keys this specific time point into a designated field), the GUI 501 transmits information of such an operation to the processing component 120 as the view-version command. The processing component 120 receives the view-version command, and accordingly makes the display component 310 display an icon (i.e., the icons 516b) corresponding to one of the backed up versions (i.e., the backed up version BK-A2) corresponding to this specific time point (i.e., the date Oct. 10, 2008).

In addition, when all of the backed up versions do not correspond to the specific time point, the processing component 120 may make the display component 310 display an icon corresponding to the newest backed up version before the specific time point. For example, under a condition that the backed up version BK-A1 corresponds to a date Jan. 1, 2006, the backed up version BK-A2 corresponds to a date Jan. 1, 2008, and the backed up version BK-A1 corresponds to a date Jan. 1, 2010, if the specific time point is the date Oct. 10, 2008, the processing component 120 will make the display component 310 display an icon corresponding to the newest backed up version before the specific time point, that is, the backed up version BK-A2.

Figure 8:
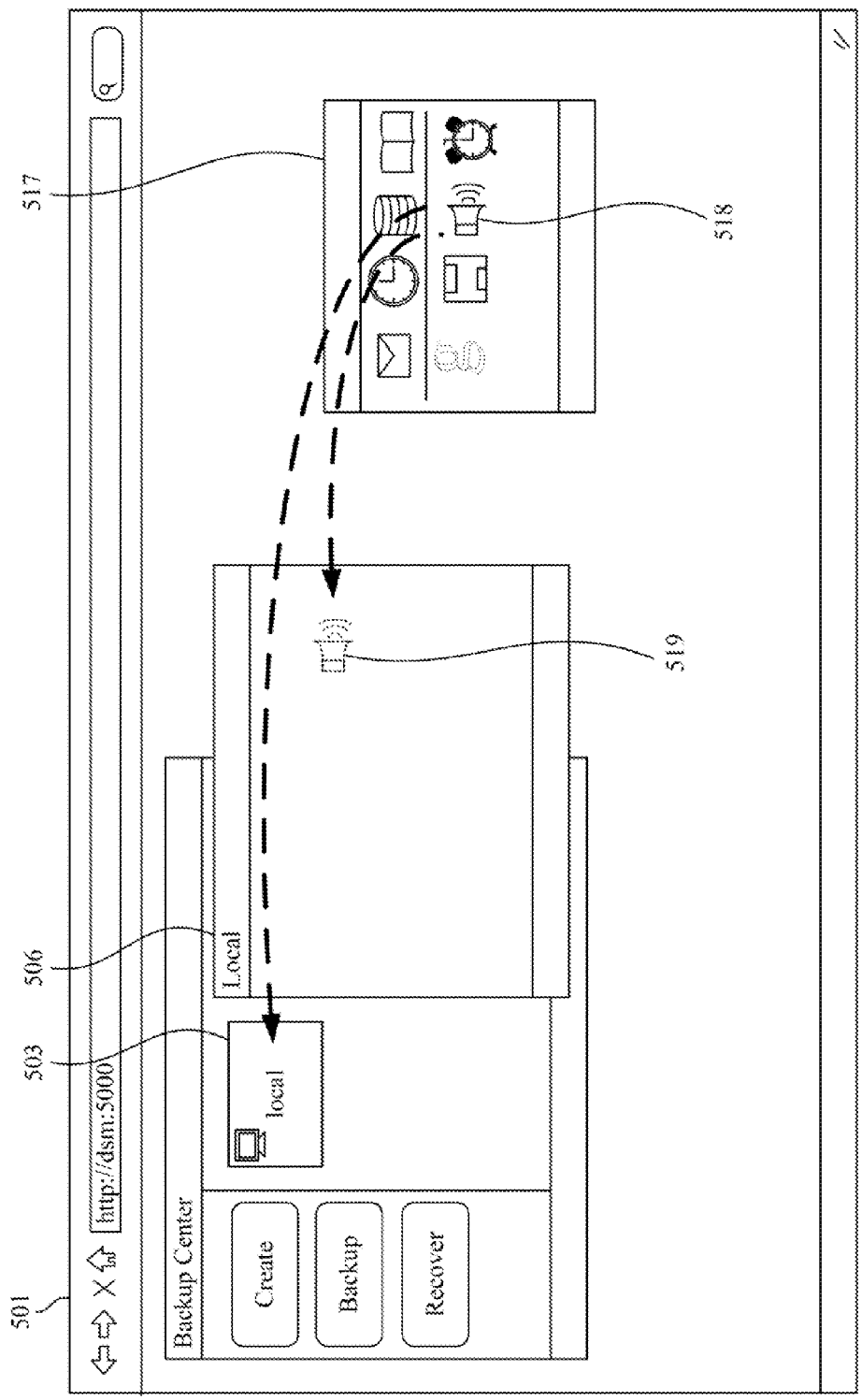

Particular reference is made to FIG. 8. In one embodiment of the present disclosure, when the processing component 120 receives an add-into-backup-list command corresponding to an application or a control panel via the GUI 501, the processing component 120 can record a backup entry E5 corresponding to the application or parameters related to the control panel by a backup list.

For example, a user may open a window 517 corresponding to an application or a control panel. An icon 518 corresponding to the application or the control panel may be presented in the window 517. When the user drags the icon 518 to a region corresponding to the icon 503 or the window 506 corresponding to the backup destination 112, the GUI 501 transmits information of such an operation to the processing component 120, so as to make the processing component 120 accordingly record the backup entry E5 corresponding to the icon 518 by the backup list LST.

Through such operation, the user can backup an application or parameters related to a control panel stored in the client device into the backup device 100 by a process that is as easy as copying a normal file.

In one embodiment, under a condition that parameters corresponding to a specific control panel (e.g. a volume panel) have been backed up in the backup destination 112, the processing component 120 may make the display component 310 display an icon 519 corresponding to the parameters corresponding to this specific control panel in the window 506 corresponding to the backup destination 112.

In one embodiment, when the processing component 120 receives an open-data command corresponding to the icon 519 via the GUI 501 (e.g., when a user double clicks a mouse left button on the icon 519 via the GUI 501), the processing component 120 opens the specific control panel and makes the display component 310 display the corresponding parameters in the specific control panel.

Through such operation, the user can view the parameters corresponding to the specific control panel conveniently.

In the following paragraphs, details of the present disclosure will be described with reference to an operating method of a backup device.

The operating method can be applied to a network device having a structure that is the same as or similar to the structure shown in FIG. 1. To simplify the description below, in the following paragraphs, the embodiment shown in FIG. 1 will be used as an example to describe the operating method according to one embodiment of the present disclosure. However, the present disclosure is not limited to application to the embodiment shown in FIG. 1, In addition, it should be noted that in the steps of the following operating method, no particular sequence is required unless otherwise specified. Moreover, the following steps also may be performed simultaneously or the execution times thereof may at least partially overlap.

Furthermore, the steps of the following operating method may be added, replaced, and/or eliminated as appropriate, in accordance with various embodiments of the present disclosure.

Figure 9:
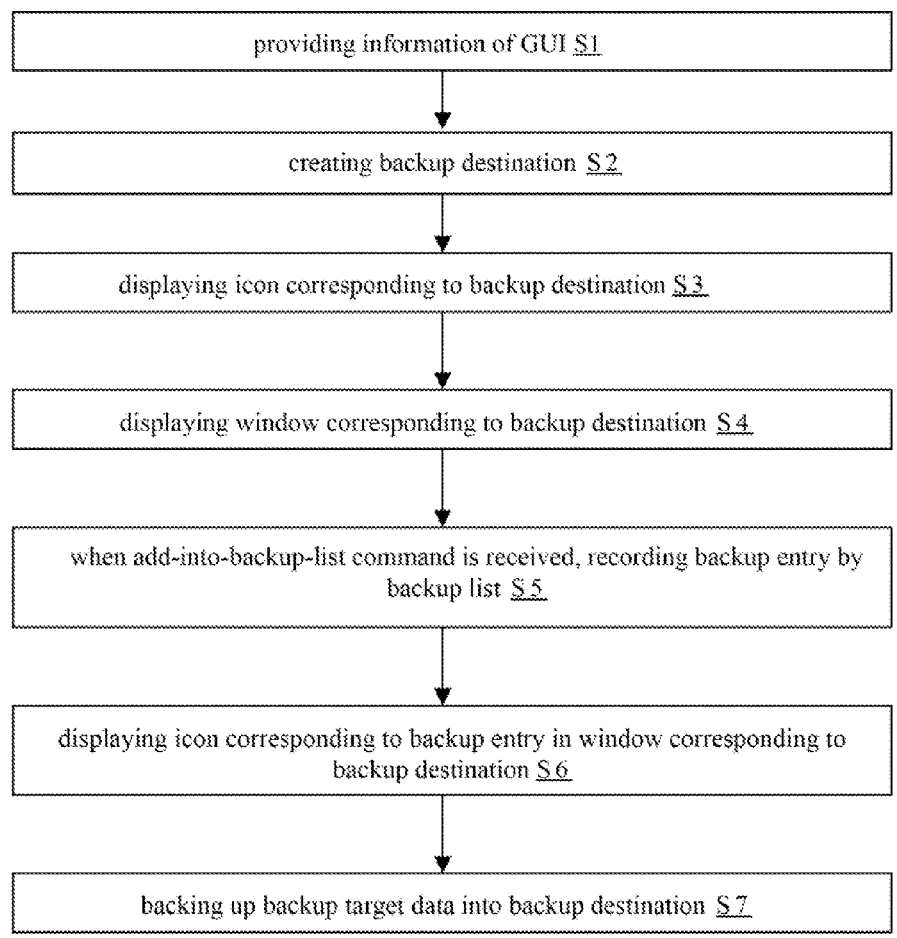
FIG. 9 is a flowchart of an operating method of a backup device according to one embodiment of the present invention.

FIG. 9 is a flowchart of an operating method 700 of a backup device according to one embodiment of the present invention. The operating method 700 includes the steps outlined below.

In step S1, the backup device 100 utilizes the processing component 120 to provide information of a GUI (e.g., the GUI 501 shown in FIG. 2) to the client device 300 via the network 200, so as to make the display component 310 display the GUI 501.

In step S2, the backup device 100 utilizes the processing component 120 to receive a create-backup-destination command via the GUI 501, and to create a backup destination 112 in the storage component 110 of the backup device 100 according to the create-backup-destination command.

In step S3, the backup device 100 utilizes the processing component 120 to make the display component 310 display an icon (e.g., the icon 503 shown in FIG. 2) corresponding to the backup destination 112 on the GUI 501. 101101 In step S4, after the backup destination 112 has been created, the backup device 100 utilizes the processing component 120 to receive an open-backup-destination command corresponding to the backup destination 112 via the GUI 501, and to make the display component 310 display a window (e.g., the window 506 shown in FIG. 3) corresponding to the backup destination 112 on the GUI 501 according to the open-backup-destination command.

It should be noted that, in some embodiments, step S4 may be omitted.

In step S5, after the backup destination 112 is created, when the backup device 100 utilizes the processing component 120 to receive an add-into-backup-list command via the GUI 501, the backup device 100 utilizes the processing component 120 to record a backup entry E1 by a backup list LST corresponding to the backup destination 112 according to the add-into-backup-list command.

In step S6, after the backup device 100 records the backup entry E1 by the backup list LST, the backup device 100 utilizes the processing component 120 to make the display component 310 display an icon corresponding to the backup entry E1 (e.g., the icon 508 shown in FIG. 3) in the window 506 corresponding to the backup destination 112.

In step S7, after the backup device 100 records the backup entry E1 by the backup list LST, when the backup device 100 utilizes the processing component 120 to receive a start-backup command, the backup device 100 utilizes the processing component 120 to backup backup target data (e.g., the file C) stored in the storage component 330 of the client device 300 into the backup destination 112 of the backup device 100 according to the start-backup command and the backup entry E1 in the backup list LST, to serve as a backed up version BK-C of the backup target data.

Through the operation described above, a user can backup data stored in the client device 300 into the backup device 100 by a process that is as easy as copying data to the backup device 100. Hence, a more user-friendly backup device can be realized In the aspects described above, a remote backup device 100 is taken as an example to backup backup target data in the client 300. However, in another aspect, it is also possible for backup target data to be backed up in the device in where the backup target data is stored. In such an aspect, the backup device can be, for example, a personal computer, a laptop computer, a tablet computer, or another suitable electronic device, but is not limited in this regard.

Figure 10:
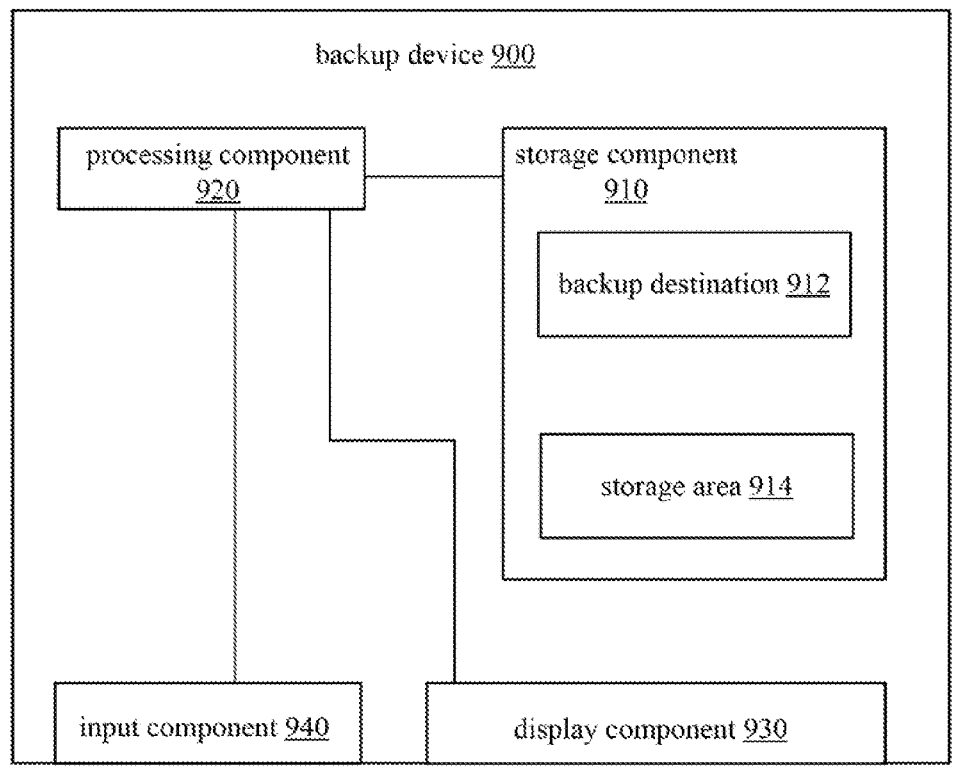
FIG. 10 is a schematic diagram of a backup device according to another embodiment of the present invention.

Reference is made to FIG. 10. FIG. 10 is a schematic diagram of a backup device 900 according to another embodiment of the present invention. In this embodiment, the backup device 900 includes a storage component 910, a processing component 920, a display component 930, and an input component 940. The processing component 920 is separately and electrically connected to the storage component 910, the display component 930, and the input component 940.

In this embodiment, the functions and implementations of the storage component 910, the processing component 920, the display component 930, and the input component 940 are substantially identical to the storage component 110/330, the processing component 10, the display component 310, and the input component 320 shown in FIG. 1. Thus, a description of many aspects that are similar will not be repeated.

In this embodiment, in addition to including a backup destination 912, the storage component 910 further includes a storage area 914. In this embodiment, the function of the storage area 914 is substantially identical to the storage component 330 shown in FIG. 1, that is, the storage area 914 is configured to store the backup target data.

In this embodiment, the processing component 920 may utilize the display component 930 to display the GUI described above, such that a user can control the backup device 900 via the GUI by using the input component 940. After the processing component 920 receives commands via the GUI as described in the paragraphs above, the processing component 920 can backup the backup target data stored in the storage area 914 in the backup destination 912.

Through such operation, a more user-friendly backup device can be realized.

Although the present invention has been described in considerable detail with reference to certain embodiments thereof, other embodiments are possible. Therefore, the scope of the appended claims should not be limited to the description of the embodiments contained herein.

What is claimed is:

1. An operating method of a backup device comprising:
   displaying a graphic user interface (GUI);
   displaying a window corresponding to a backup destination on the GUI;
   under a condition that an add-into-backup-list command is received via the GUI, recording a first backup entry corresponding to backup target data by a backup list according to the add-into-backup-list command;
   displaying an icon corresponding to the backup target data on the GUI;
   displaying an icon corresponding to the backup destination on the GUI;
   wherein the step of recording the first backup entry by the backup list according to the add-into-backup-list command comprises:
   recording the first backup entry by the backup list under a condition that the icon corresponding to the backup target data is dragged to a region corresponding to the icon corresponding to the backup destination or dragged to the window corresponding to the backup destination;
   after the first backup entry is recorded by the backup list, displaying an icon corresponding to the first backup entry in the window corresponding to the backup destination; and
   under a condition that a start-backup command is received via the GUI, backing up the backup target data into the backup destination to serve as a backed up version of the backup target data according to the start-backup command.

2. The operating method as claimed in claim 1 further comprising:
   determining whether another backup entry is added into the backup list during a predetermined period after the first backup entry is recorded by the backup list; and
   automatically backing up the backup target data into the backup destination under a condition that no backup entry is added into the backup list during the predetermined period after the recordation of the first backup entry.

3. The operating method as claimed in claim 1 further comprising:
   displaying an icon corresponding to the backup target data on the GUI; and
   displaying an icon corresponding to the backup destination on the GUI;
   wherein the step of recording the first backup entry by the backup list according to the add-into-backup-list command comprises:
   recording the first backup entry by the backup list under a condition that a copy command corresponding to the icon corresponding to the backup target data and a paste command corresponding to either the icon corresponding to the backup destination or the window corresponding to the backup destination are sequentially received via the GUI.

4. The operating method as claimed in claim 1 further comprising:
   displaying an icon corresponding to the backup target data on the GUI;
   wherein the step of recording the first backup entry by the backup list according to the add-into-backup-list command comprises:
   recording the first backup entry by the backup list under a condition that an add-to-backup command in a mouse right click menu is received via the GUI, wherein the mouse right click menu corresponds to the icon corresponding to the backup target data.

5. The operating method as claimed in claim 1, wherein a second backup entry is recorded in the backup list, the operating method comprising:
   displaying an icon corresponding to the second backup entry on the GUI according to a backup state of the second backup entry.

6. The operating method as claimed in claim 5, wherein the second backup entry corresponds to backed up data, and the backed up data is backed up in a plurality of backed up versions, the operating method comprising:
   displaying a plurality of icons respectively corresponding to the backed up versions of the backed up data on the GUI under a condition that a display-backup-version command is received via the GUI.

7. The operating method as claimed in claim 5, wherein the second backup entry corresponds to backed up data, and the backed up data is backed up in a plurality of backed up versions, the operating method comprising:
   under a condition that a view-version command corresponding to a time point is received via the GUI, displaying an icon corresponding to one of the backed up versions corresponding to the time point on the GUI.

8. The operating method as claimed in claim 5, wherein the second backup entry corresponds to backed up data, and the backed up data is backed up in a backed up version, the operating method comprising:
under a condition that a recovery command is received via the GUI, recovering the backed up data by using the backed up version of the backed up data according to the recovery command.

9. The operating method as claimed in claim 5, wherein the second backup entry corresponds to backed up data, and the backed up data is backed up in a backed up version, the operating method comprising:
displaying an icon corresponding to the second backup entry on the GUI; and
opening the backed up version of the backed up data under a condition that an open-data command corresponding to the icon corresponding to the second backup entry is received via the GUI.

10. A backup device comprising:
a storage component comprising a backup destination; and
a processing component configured for:
providing information of a GUI to a display component to make the display component display the GUI; and
making the display component display a window corresponding to a backup destination on the GUI;
wherein under a condition that the processing component receives an add-into-backup-list command via the GUI, the processing component records a first backup entry corresponding to backup target data by a backup list according to the add-into-backup-list command,
making the display component display an icon corresponding to the backup target data on the GUI,
making the display component display an icon corresponding to the backup destination on the GUI,
recording the first backup entry by the backup list under a condition that the icon corresponding to the backup target data is dragged to a region corresponding to the icon corresponding to the backup destination or dragged to the window corresponding to the backup destination,
after the processing component records the first backup entry by the backup list, the processing component makes the display component display an icon corresponding to the first backup entry in the window corresponding to the backup destination, and
under a condition that the processing component receives a start-backup command via the GUI, the processing component backs up the backup target data into the backup destination to serve as a backed up version of the backup target data according to the start-backup command.

11. The backup device as claimed in claim 10, wherein the processing component is further configured for:
determining whether another backup entry is added into the backup list during a predetermined period after the first backup entry is recorded by the backup list; and
automatically backing up the backup target data into the backup destination under a condition that no backup entry is added into the backup list during the predetermined period after the recordation of the first backup entry.

12. The backup device as claimed in claim 10, wherein the processing component is further configured for:
making the display component display an icon corresponding to the backup target data on the GUI;
making the display component display an icon corresponding to the backup destination on the GUI; and
recording the first backup entry by the backup list under a condition that a copy command corresponding to the icon corresponding to the backup target data and a paste command corresponding to either the icon corresponding to the backup destination or the window corresponding to the backup destination are sequentially received via the GUI.

13. The backup device as claimed in claim 10, wherein the processing component is further configured for:
making the display component display an icon corresponding to the backup target data on the GUI;
making the display component display an icon corresponding to the backup destination on the GUI; and
recording the first backup entry by the backup list under a condition that the add-into-backup-list command in a mouse right click menu is received via the GUI, wherein the mouse right click menu corresponds to the icon corresponding to the backup target data.

14. The backup device as claimed in claim 10, wherein a second backup entry is recorded in the backup list, and the processing component is further configured for:
making the display component display an icon corresponding to the second backup entry on the GUI according to a backup state of the second backup entry.

15. The backup device as claimed in claim 14, wherein the second backup entry corresponds to backed up data, the backed up data is backed up in a plurality of backed up versions, and the processing component is further configured for:
making the display component display a plurality of icons respectively corresponding to the backed up versions of the backed up data on the GUI under a condition that a display-backup-version command is received via the GUI.

16. The backup device as claimed in claim 14, wherein the second backup entry corresponds to backed up data, the backed up data is backed up in a plurality of backed up versions, and the processing component is further configured for:
under a condition that a view-version command corresponding to a time point is received via the GUI, making the display component display an icon corresponding to one of the backed up versions corresponding to the time point on the GUI.

17. The backup device as claimed in claim 14, wherein the second backup entry corresponds to backed up data, the backed up data is backed up in a backed up version, and the processing component is further configured for:
under a condition that a recovery command is received via the GUI, recovering the backed up data by using the backed up version of the backed up data according to the recovery command.

18. The backup device as claimed in claim 14, wherein the second backup entry corresponds to backed up data, the backed up data is backed up in a backed up version, and the processing component is further configured for:
making the display component display an icon corresponding to the second backup entry on the GUI; and
opening the backed up version of the backed up data under a condition that an open-data command corresponding to the icon corresponding to the second backup entry is received via the GUI.

* * * * *